United States Patent
Maniyar et al.

(10) Patent No.: US 12,500,593 B1
(45) Date of Patent: Dec. 16, 2025

(54) METHODS AND CIRCUITRY FOR CALIBRATION

(71) Applicant: Cirrus Logic International Semiconductor Ltd., Edinburgh (GB)

(72) Inventors: Aadilhussain Maniyar, Reading (GB); Peter J. Tonge, Hampshire (GB); Rohit Tomar, Edinburgh (GB); Robert J. Hatfield, Edinburgh (GB)

(73) Assignee: Cirrus Logic Inc., Austin, TX (US)

( * ) Notice: Subject to any disclaimer, the term of this patent is extended or adjusted under 35 U.S.C. 154(b) by 0 days.

(21) Appl. No.: 18/783,725

(22) Filed: Jul. 25, 2024

(51) Int. Cl.
| | | |
|---|---|---|
| H03M 1/10 | (2006.01) | |
| H04N 17/00 | (2006.01) | |
| H04N 25/78 | (2023.01) | |

(52) U.S. Cl.
CPC ........ *H03M 1/1023* (2013.01); *H04N 17/002* (2013.01); *H04N 25/78* (2023.01)

(58) Field of Classification Search
CPC .... H03M 1/1023; H04N 25/78; H04N 17/002
USPC .......................................... 248/187; 348/187
See application file for complete search history.

(56) References Cited

U.S. PATENT DOCUMENTS

| | | | |
|---|---|---|---|
| 5,519,441 A | 5/1996 | Gusmano et al. | |
| 2002/0033891 A1* | 3/2002 | Ying | H04N 25/633 |
| | | | 348/241 |
| 2002/0074499 A1* | 6/2002 | Butler | G01J 5/22 |
| | | | 348/E5.081 |
| 2008/0129563 A1* | 6/2008 | Boomer | H03M 1/1023 |
| | | | 341/120 |

OTHER PUBLICATIONS

Search Report under Section 17, UKIPO, Application No. GB2505241.6, mailed Sep. 29, 2025.

* cited by examiner

*Primary Examiner* — Nathan J Flynn
(74) *Attorney, Agent, or Firm* — Jackson Walker L.L.P.

(57) ABSTRACT

Circuitry for processing an input signal from a sensor, the circuitry comprising: an input configured to receive the input signal; bias circuitry configured to apply a bias to the input signal to obtain a biased input signal; a gain stage configured to apply a gain to the biased input signal to obtain an amplified input signal; an analog-to-digital converter (ADC) configured to convert the amplified input signal to a digital output signal; wherein, during a calibration phase, the control circuitry is configured to: control the bias circuitry to apply a macro offset to the input signal, the macro offset to bring the amplified input signal within a dynamic range of the ADC; and determine a micro offset to be applied during a measurement phase of the sensor based on the macro offset and the digital output signal; and wherein during the measurement phase, the control circuitry is configured to control the bias circuitry to disable application of the macro offset and apply the micro offset to the input signal, the macro offset having a greater magnitude than the micro offset.

10 Claims, 4 Drawing Sheets

METHODS AND CIRCUITRY FOR CALIBRATION

TECHNICAL FIELD

The present disclosure relates to methods and circuitry for calibration.

BACKGROUND

Image sensors, such as charged coupled devices (CCD), typically comprise a plurality of optical sensing elements (e.g. photo-diodes) that each represents a pixel. Each sensing element outputs a signal representing an intensity of light falling on it.

Image sensors are sensitive to variations in both manufacturing and environmental conditions. Variations in manufacture between sensors can lead to DC offset between signals output from sensing elements (from one sensor to the next). Variations in environmental conditions, such as temperature, can lead to changes in DC offset over time for a single sensor, due to more of fewer carriers being generated thermally (as opposed to optically). For example, in a photodiode, thermally generated carriers can influence DC offset, which can mask the component of the photodiode's output signal associated with optically generated carriers.

The combination of effects of manufacturing and environment tend to manifest in an overall direct current (DC) offset associated with a particular sensor. Variations in DC offset, both for one sensor over time and from one sensor to another, can adversely affect the operation of downstream processing circuitry.

SUMMARY

According to a first aspect of the disclosure, there is provided Circuitry for processing an input signal from a sensor, the circuitry comprising: an input configured to receive the input signal; bias circuitry configured to apply a bias to the input signal to obtain a biased input signal; a gain stage configured to apply a gain to the biased input signal to obtain an amplified input signal; an analog-to-digital converter (ADC) configured to convert the amplified input signal to a digital output signal; wherein, during a calibration phase, the control circuitry is configured to: control the bias circuitry to apply a macro offset to the input signal, the macro offset to bring the amplified input signal within a dynamic range of the ADC; and determine a micro offset to be applied during a measurement phase of the sensor based on the macro offset and the digital output signal; and wherein during the measurement phase, the control circuitry is configured to control the bias circuitry to disable application of the macro offset and apply the micro offset to the input signal, the macro offset having a greater magnitude than the micro offset.

The bias circuitry may comprise: a digital-to-analog converter, DAC, configured to apply the micro offset, the control circuitry configured to output a digital control signal to the DAC based on the macro offset and the digital output signal.

The bias circuitry may comprise: a subtraction module configured to subtract the micro offset from the input signal during the measurement phase.

The gain stage may comprise a first gain stage input for receiving the input signal, a second gain stage input and a gain stage output for outputting the amplified input signal.

Applying the macro offset may comprise adjusting a reference voltage applied to the second gain stage input.

The gain stage output may be a differential output, wherein the ADC may be a differential ADC.

The macro offset may be equal to half the dynamic range of the ADC.

The gain stage output may be a single ended output, and the ADC may be a single ended ADC.

According to another aspect of the disclosure, there is provided an image capturing system, comprising: an imaging sensor for producing an input signal; bias circuitry configured to apply a bias to the input signal to obtain a biased input signal; a gain stage configured to apply a gain to the biased input signal to obtain an amplified input signal; an analog-to-digital converter (ADC) configured to convert the amplified input signal to a digital output signal, During a calibration phase, the control circuitry is configured to: control the bias circuitry to apply a macro offset to the input signal, the macro offset to bring the amplified input signal within a dynamic range of the ADC; and determine a micro offset to be applied during a measurement phase of the sensor based on the macro offset and the digital output signal during the calibration phase; and wherein during the measurement phase, the control circuitry is configured to control the bias circuitry to disable application of the macro offset and apply the micro offset to the input signal, the macro offset having a greater magnitude than the micro offset.

According to another aspect of the disclosure, there is provided a conversion system for an image sensor comprising: an input to receive an analog signal from an image sensor; a level shifter to adjust the level of the received analog signal to provide an adjusted signal; and an ADC to convert the adjusted signal to a digital output signal, wherein during a system calibration operation the level shifter is disabled, such that the received analog input signal is converted by the ADC.

According to another aspect of the disclosure, there is provided an electronic device, comprising a circuitry or system as described above. The electronic device may comprises one of a camera, a printer, an imaging device, a mobile computing device, a laptop computer, a tablet computer, a games console, a remote control device, a home automation controller or a domestic appliance, a toy, a robot, an audio player, a video player, or a mobile telephone, and a smartphone.

According to another aspect of the disclosure, there is provided a method of processing an input signal from a sensor, the method comprising: receiving the input signal; during a calibration phase, applying a macro offset to the input signal to obtain a biased input signal; during a measurement phase, applying a micro offset to the input signal to obtain the biased input signal, the macro offset having a greater magnitude than the micro offset, the macro offset having a greater magnitude than the micro offset; applying a gain to the biased input signal to obtain an amplified input signal; converting the amplified input signal to a digital output signal, wherein a magnitude of the macro offset is set to prevent the amplified input signal exceeding a dynamic range of the ADC; and wherein a magnitude of the micro offset is dependent on the macro offset and the digital output signal during the calibration phase.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the present disclosure will now be described by way of non-limiting examples with reference to the drawings, in which.

DESCRIPTION OF EMBODIMENTS

Embodiments of the present disclosure relate to circuitry for calibrating signals obtained from image sensors. Specifically, embodiments of the present disclosure aim to reduce the time taken to calibrate signals obtained from an image sensor by avoiding or at least ameliorating instances of saturation of ADCs used in processing image sensor signals. To do so, in a first calibration cycle, an input signal is level shifted to a midpoint in a dynamic range of an ADC. Offset error is estimated based on the digital signal output from the ADC and the level shifting applied to the input signal an offset (thereby avoiding the need to over-range the ADC). For subsequent cycles, the level of the input signal is shifted back to a measurement mode value, the offset estimation applied to ensure that the signal is within range of the ADC.

Figure 1:
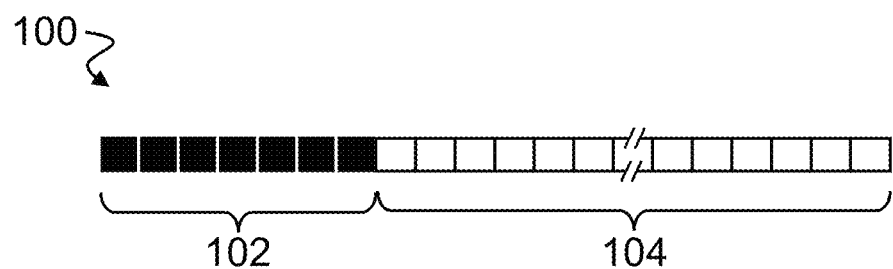
FIG. 1 is a schematic illustration of a line of pixels as seen by an image sensor including black pixels and image pixels.

FIG. 1 illustrates the concept of "black pixels" and "image pixels" with reference to a typical image sensor 100. The image sensor 100 shown in FIG. 1 is a linear-type image sensor. However, embodiments of the present disclosure are not limited to such sensors and are equally applicable to other sensors, such as array-type image sensors.

The image sensor 100 comprises a plurality of black level sensing elements 102, each representing a black pixel, that are used to track variations in sensor output. The black level sensing elements 102 may each be optically shielded from any light to generate a black level reference, conventionally 0V. Optical shielding is one of several methods of generating a black level reference.

The remaining sensing elements 104 in the sensor 100, referred to herein as image level sensing elements 110, are not optically shielded and hence each provide an output representing light falling on their surface. Truly white light incident at the remaining sensing elements 110 will result in an output voltage at or near a supply voltage Vdd.

Where the black level sensing elements 102 and image level sensing elements 104 are manufactured together and operated under the same environmental conditions, each of the black level sensing elements 102 will provide the same output signal as each of the image level sensing elements 104 when not exposed to light (i.e. when in the same optical conditions as the optically shielded black level sensing elements 102). Thus, the black level sensing elements 102 may be used to determine an offset associated with the image level sensing elements 104. Compensation can then be applied to sensor signals obtained from image level sensing elements 104 to account for estimated DC offset.

To provide compensation, calibration circuitry may be provided to subtract a signal equal to, or representative of, the black level sensing element 102 output signals that are output from the sensor during a calibration period (i.e. an "black pixel" period) from each image pixel sensing element 104 output signal during the operational period (i.e. an "image pixel" period). In doing so, environmentally sensitive components of signals output from image pixel sensing elements 104, may be removed.

Figure 2:
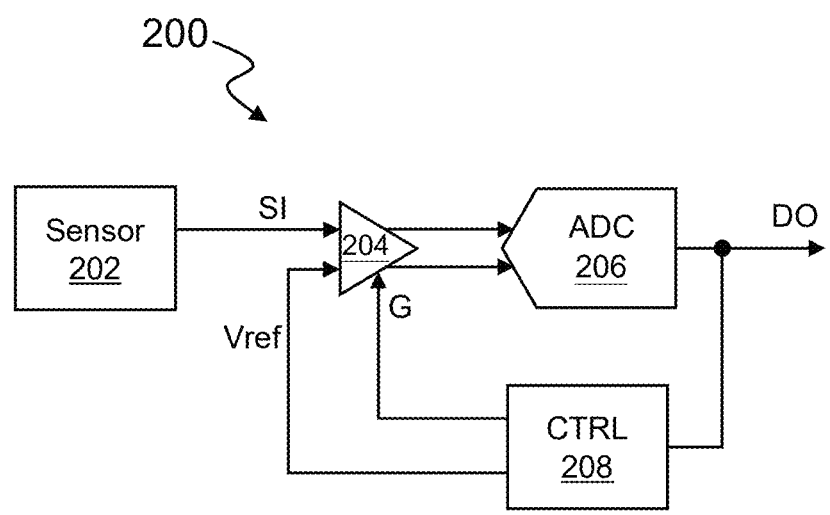
FIG. 2 is a block diagram of known processing circuitry.

FIG. 2 is a schematic diagram of an example of prior art processing circuitry 200 for processing a signal SI received from an image sensor 202. The processing circuitry 200 comprises a programmable gain amplifier (PGA) 204, an analog-to-digital converter (ADC) 206 and control circuitry 208. In this example, the PGA 204 and ADC 206 are differential in nature. Thus, the PGA 204 is configured to output a differential output signal which is received as a differential input signal by the ADC 206. In other examples, the PGA 204 and ADC 206 may be implemented as single ended devices.

The PGA 204 is configured to condition the input signal SI by applying a gain G and a DC offset to the input signal SI, and output a differential conditioned signal SC. The conditioned signal SC is provided to the ADC 206 which generates a digital output signal DO representing the difference between first and second components of the differential conditioned signal SC. As noted above, an ideal black level sensing element 102 will output 0V and The control circuitry 208 may control the DC offset and gain G applied by the PGA 204 to the input signal SI received from the sensor 202. The control circuitry 208 may adjust the DC offset applied to the input signal SI by adjusting the reference voltage Vref provided to the PGA 204. The control circuitry 208 may control the DC offset such that the DC offset of the conditioned input signal SC matches a mid-point voltage of the ADC 206. The control circuitry 208 may adjust (or program) the gain G applied by the PGA 204 by adjusting an amplitude of a gain signal G applied to the PGA 204. The control circuitry 208 may adjust the gain G to match a dynamic range of the conditioned signal SC to a dynamic range of the ADC 206, thereby maximising signal-to-noise ratio (SNR) associated with the ADC 206. Thus, the control circuitry 208 may adjust the reference voltage Vref and/or the gain G based on the digital output DO.

As noted above, to provide compensation, the control circuitry 208 may subtract a signal equal to, or representative of, the black level sensing element 102 output signals that are output from the sensor during a calibration period (i.e. an "black pixel" period) from each image pixel sensing element 104 output signal during the operational period (i.e. an "image pixel" period). The control circuitry 208 may achieve this by adjusting the reference voltage Vref at the input of the PGA 204.

An issue arises when signals output from a black level sensing element 102 comprises a larger error than can be handled by the ADC 206. Voltage levels in state-of-the-art sensors typically vary by up to 500 mV (+/−250 mV) from pixel to pixel and multiple sensors can have different offsets. If the dynamic range of the ADC 206 is +/−Vdd, voltage levels of outputs from the black level sensing element 102 falling outside of this range will lead to clipping of the ADC 206. In doing so, the number of calibration iterations needed to calibrate a particular sensor needs to be increased to determine the DC offset of each black level sensing element 102. These additional calibration iterations increase the time associated with calibration.

Figure 3:
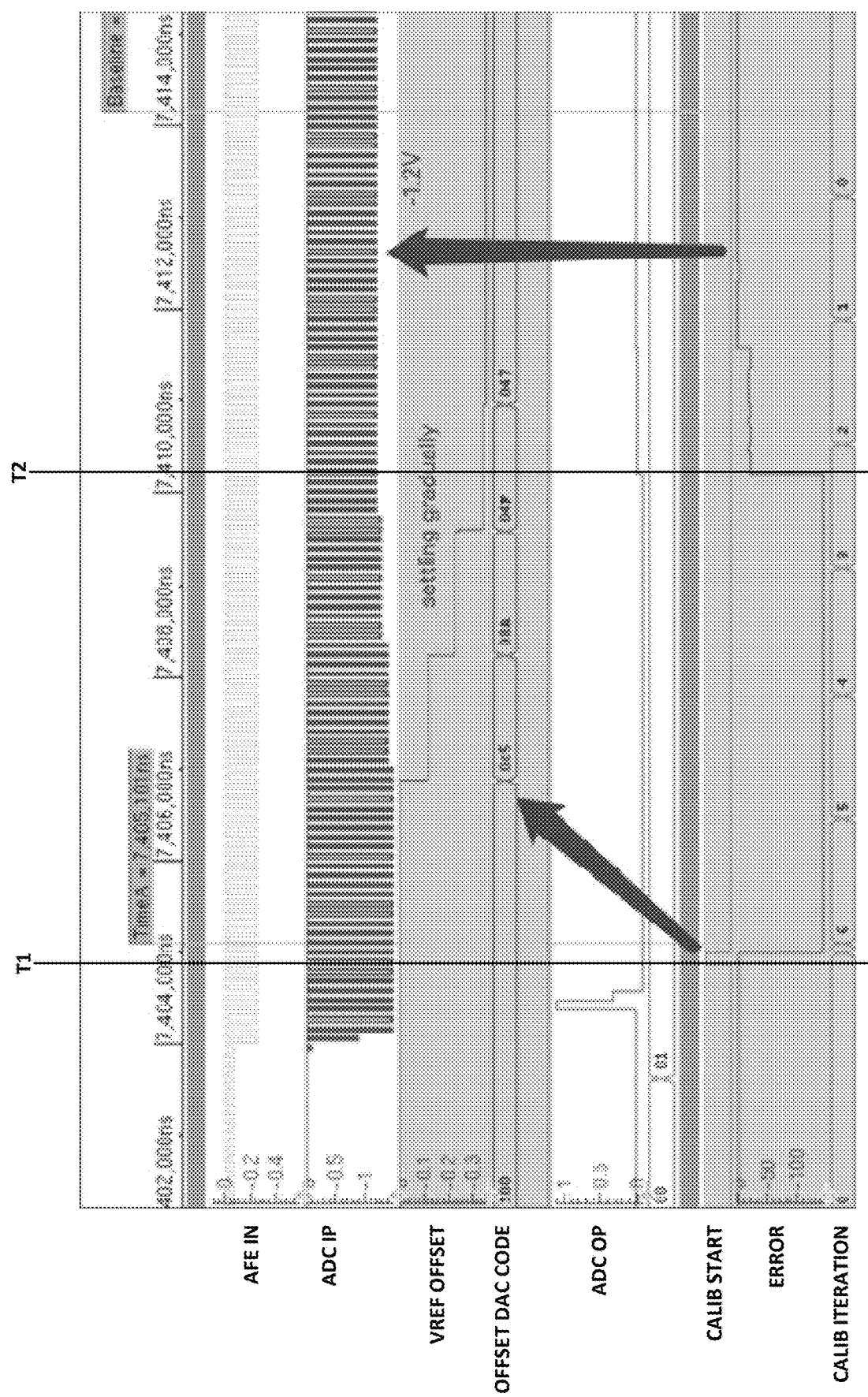
FIG. 3 is a timing diagram for the circuitry of FIG. 2.

FIG. 3 is a timing diagram for the circuitry 200 shown in FIG. 2 which exemplifies this extended calibration period. In this example, the dynamic range of the ADC 206 is +/−1.2V. Voltages at the input of the ADC 206 falling outside of this range lead to clipping in the ADC 206.

At time T1, the voltage ADC IP at the input to the ADC 206 is at −1.49V, which is outside of the dynamic range of the ADC 206. As such, the output ADC OP of the ADC 206 is saturated at the lowest possible value (digital zero in this case).

At time T2, calibration commences. In response to the ADC OP being saturated, the control circuitry 208 may decrease offset Vref applied by the PGA 204 (by adjusting the reference voltage Vref), thereby increasing the input voltage ADC IP provided to the ADC 206. During each iteration of conversion by the ADC 206, the offset in the PGA 204 (shown as signal OFFSET in the timing diagram 300) is increased, which in turn leads to an increase in the voltage ADC IP at the input of the ADC 206. The offset voltage OFFSET is decreased stepwise three times until after the fourth iteration, the ADC input signal ADC IP finally falls within the dynamic range of the ADC 206 and the ADC output ADC OP is no longer saturated, thereby providing an accurate representation of the ADC input ADC IP. Thus, in this example, calibration of the offset applied by the PGA 204 takes four iterations of measurement, conversion and adjustment.

Prior art solutions for addressing this problem involve designing the ADC 206 with a large over-range such that signals which would otherwise fall outside of the ADC 206's dynamic range fall within its range. In doing so, the number of calibration iterations is reduced to the detriment of power consumption. Increasing the dynamic range of the ADC 206 leads to increased power consumption and reduced efficiency of the ADC 206.

To address or at least ameliorate one or more of the above issues associated with the state-of-the-art calibration circuitry, embodiments of the present disclosure provide novel calibration circuitry for actively conditioning the signal provided to an ADC so as to maximise dynamic range usage across the range of that ADC whilst eliminating or at least reducing instances of clipping in the ADC.

Figure 4:
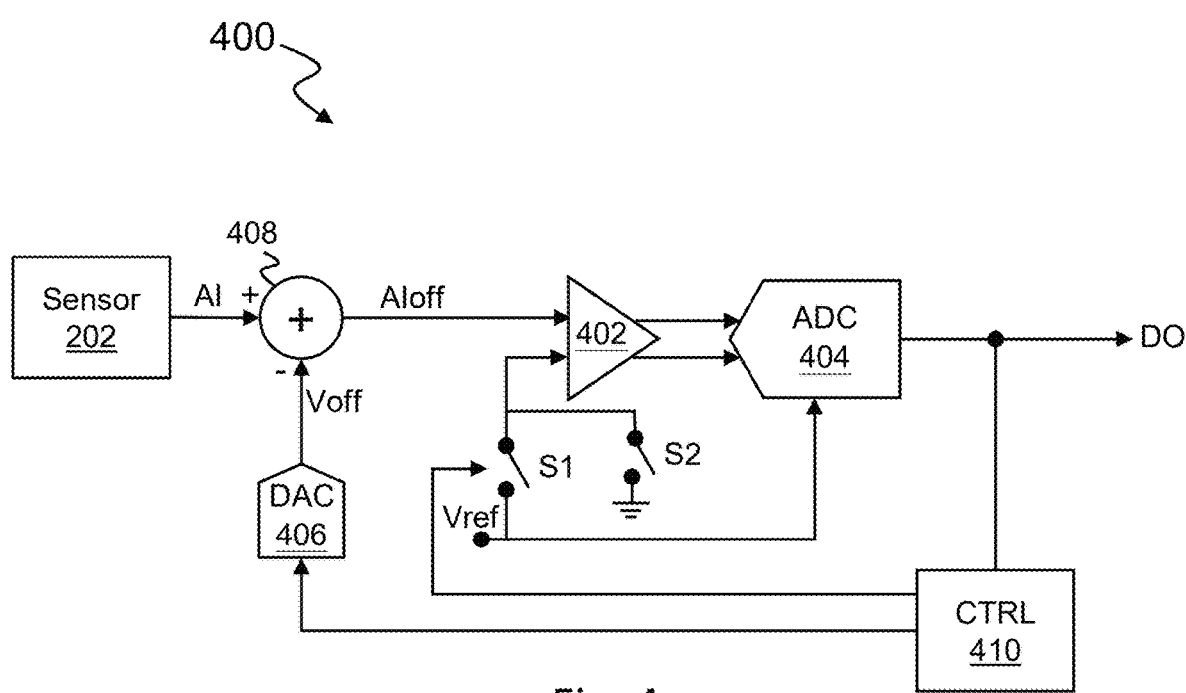
FIG. 4 is a block diagram of processing circuitry.

FIG. 4 is a schematic diagram of processing circuitry 400 according to embodiments of the present disclosure. The circuitry comprises a gain stage 402, an ADC 404, a DAC 406, a subtraction module 408 and control circuitry 410.

The subtraction module 408 is configured to receive a sensor signal AI from the sensor 202 and subtract an offset voltage Voff received from the DAC 406 from the sensor signal AI to generate an offset sensor signal AIoff. The offset sensor signal AIoff is provided as a first input to the gain stage 402. A second input of the gain stage 402 is switchably coupled to either a first reference voltage Vref via a first switch S1 or a second reference voltage GND (0V) via a second switch S2. The first and second switches S1, S2 are controlled by the control circuitry 410 such that either the first switch S1 is closed and the second switch S2 is open, or the second switch S2 is closed and the first switch S1 is open. The gain stage 402 is configured to output a differential output signal AIdiff based on a difference between the offset sensor signal AIoff and the voltage at the second input (i.e. either the first or second reference voltages Vref, GND, depending on which of the first and second switches S1, S2 is closed. The reference voltage Vref is set such that when the second input of the gain stage 402 is coupled to the first reference voltage Vref and when the sensor 202 has zero offset error, the differential output of the gain stage 402 extends between +/−Vref, i.e. the dynamic range of the ADC 404.

The differential output signal AIdiff is provided as an input to the ADC 404. The ADC is configured to output a digital output signal DO which is a digital representation of the differential output signal AIdiff. The digital output signal DO is also provided to the control circuitry 410 which is configured to control the switches S1, S2 (as noted above) in addition to the DAC 406. The control circuitry 410 is configured to control the DAC 406 to convert a digital control signal DC generated by the control circuitry 410 into the offset voltage Voff provided to the subtraction module 408. Optionally, the DAC 406 may be integrated into the control circuitry 410. In doing so, the control circuitry 410 may be configured to generate the offset voltage Voff.

During normal operation, control module 410 is configured to level shift the differential output signal AIdiff by the difference between the first and second reference voltages Vref, GND, i.e. −Vref by opening the second switch S2 and closing the first switch S1. In doing so, the differential output signal AI diff provided to the ADC 404 is biased to the midpoint of the ADC 404 whose dynamic range may be equal to +/−Vref. Thus, the dynamic range of the ADC 404 is maximised.

During calibration, the control circuitry 410 is configured to disable level shifting closing the second switch S2 and opening the first switch S1. In doing so, signals with a large negative offset that would otherwise fall outside of the dynamic range of the ADC 404 are brought into range of the ADC 404 during offset calibration. Upon receipt of the digital output DO (representing the differential output signal AIdiff) and with knowledge of the status of level shift at the gain stage 402 (due to control of the first and second and second switches S1, S2), the control module may determine an offset voltage Voff to be applied via the DAC 406 at the subtraction module 408. Thus, a determination of appropriate level of offset voltage Voff can be made over a single calibration iteration, that offset then being applied during a second calibration iteration. Thus, the speed and efficiency of calibration of the processing circuitry 400 is increase when compared to the circuitry 200 of FIG. 2.

Once the value of the offset voltage Voff has been determined by the control circuitry 410, the processing circuitry 400 may switch back to the normal (measurement) mode of operation, in which the offset voltage Voff is applied to the input signal AI and the first reference voltage Vref is applied at the second input of the gain stage 402 (by closing switch S1 and opening switch S2).

Figure 5:
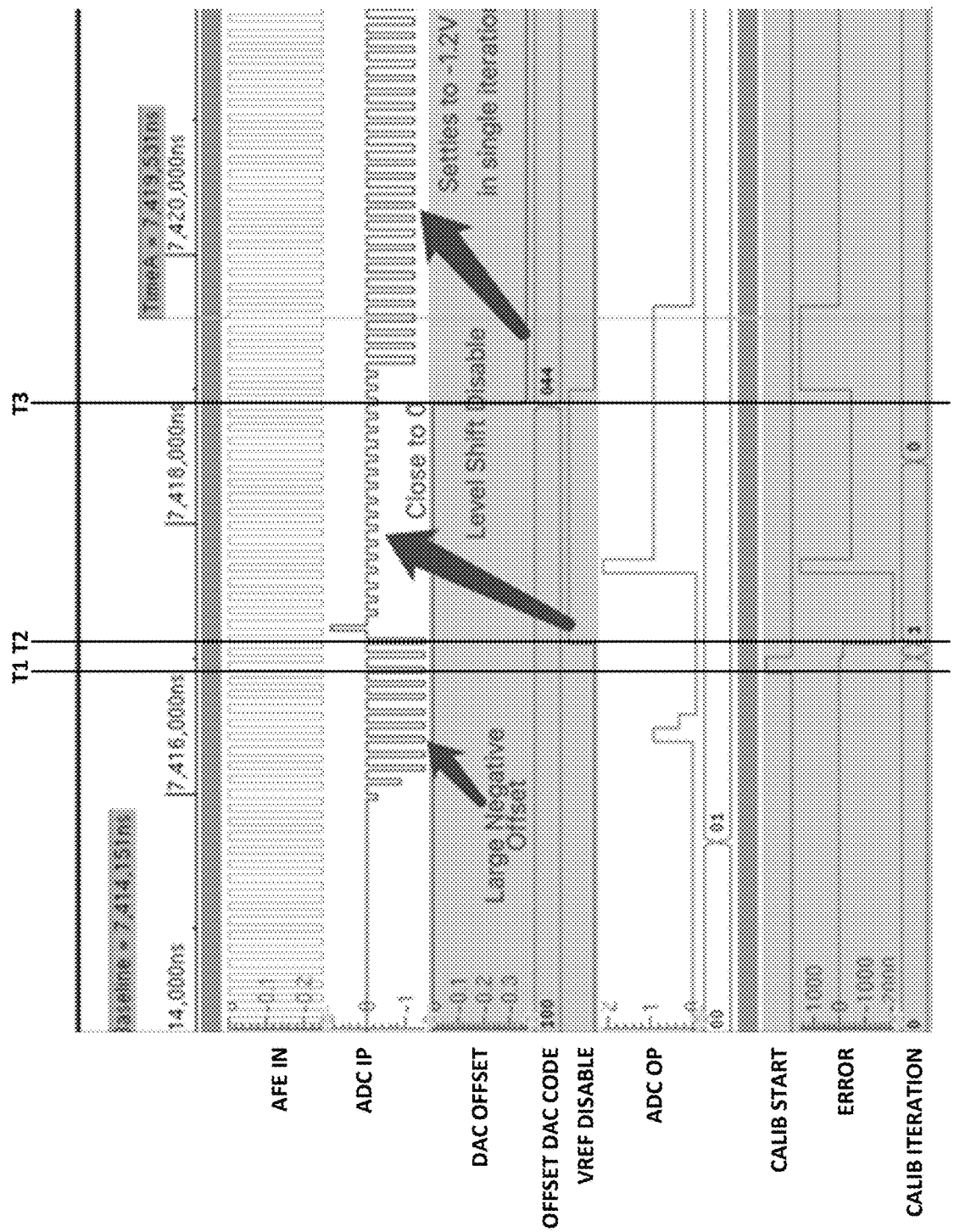
FIG. 5 is a timing diagram for the circuitry of FIG. 4.

FIG. 5 is a timing diagram for the circuitry 400 shown in FIG. 4. Like the ADC 206, in this example, the dynamic range of the ADC 404 is +/−1.2V.

Before calibration commences at time T1, the voltage ADC IP at the input to the ADC 206 decreases to −1.49V, outside of the dynamic range of the ADC 206. As such, the output ADC OP of the ADC 206 is saturated at its lowest possible value (−1.2V).

At time T1, calibration is initiated by the calibration start signal CALIB START. Shortly after at time T2, level shifting is disabled by switching the reference voltage applied at the second input of the gain stage 402 from the first reference voltage Vref to the second reference voltage GND. The input voltage ADC IP to the ADC 404 thereby increases by Vref (in this case 1.2V), and can be seen as being close to zero voltage. This causes the ADC output ADC OP in turn to be brought into range (the ADC 404 is no longer saturated) in a single calibration iteration. The error signal ERROR can then be used to determine the offset to be applied by the DAC 406 having knowledge of the Vref and the digital output ADC OP.

At time T3, the control circuitry 410 controls the DAC 406 to adjust the offset voltage Voff and switch the second input of the gain stage 402 from the second reference voltage GND to the first reference voltage Vref. The processing circuitry 400 is thus calibrated to the sensor 202, accounting for any offset error associated with the sensor 202. In other words, the ADC input ADC IP is now biased to the midpoint of the dynamic range of the ADC 404.

The circuitry following the sensor may contain a gain stage amplifier to amplify, or possibly attenuate, the sensor output signal so as to match the sensor output signal range to the input signal range of the circuitry following the sensor, for example, to span a greater range or even the full input range of an ADC. The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus, the code may comprise conventional program code or microcode or, for example code for setting up or controlling an ASIC or FPGA. The code may also comprise code for dynamically configuring re-configurable apparatus such as re-programmable logic gate arrays. Similarly, the code may comprise code for a hardware description language such as Verilog™ or VHDL (Very high-speed integrated circuit Hardware Description Language). As the skilled person will appreciate, the code may be distributed between a plurality of coupled components in communication with one another. Where appropriate, the embodiments may also be implemented using code running on a field-(re) programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general-purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. Circuitry for processing an input signal from a sensor, the circuitry comprising:
    an input configured to receive the input signal;
    bias circuitry configured to apply a bias to the input signal to obtain a biased input signal;
    a gain stage configured to apply a gain to the biased input signal to obtain an amplified input signal;
    an analog-to-digital converter (ADC) configured to convert the amplified input signal to a digital output signal;
    wherein, during a calibration phase, the control circuitry is configured to:
        control the bias circuitry to apply a macro offset to the input signal, the macro offset to bring the amplified input signal within a dynamic range of the ADC; and determine a micro offset to be applied during a measurement phase of the sensor based on the macro offset and the digital output signal; and wherein during the measurement phase, the control circuitry is configured to control the bias circuitry to disable application of the macro offset and apply the micro offset to the input signal, the macro offset having a greater magnitude than the micro offset.

2. Circuitry of claim 1, wherein the bias circuitry comprises:
a digital-to-analog converter, DAC, configured to apply the micro offset, the control circuitry configured to output a digital control signal to the DAC based on the macro offset and the digital output signal.

3. Circuitry of claim 2, wherein the bias circuitry comprises:
a subtraction module configured to subtract the micro offset from the input signal during the measurement phase.

4. Circuitry of claim 1, wherein:
the gain stage comprises a first gain stage input for receiving the input signal, a second gain stage input and a gain stage output for outputting the amplified input signal; and
applying the macro offset comprises adjusting a reference voltage applied to the second gain stage input.

5. Circuitry of claim 3, wherein the gain stage output is a differential output, wherein the ADC is a differential ADC.

6. Circuitry of claim 1, wherein macro offset is equal to half the dynamic range of the ADC.

7. Circuitry of claim 3, wherein the gain stage output is a single ended output, and wherein the ADC is a single ended ADC.

8. An image capturing system, comprising:
an imaging sensor for producing an input signal;
bias circuitry configured to apply a bias to the input signal to obtain a biased input signal;
a gain stage configured to apply a gain to the biased input signal to obtain an amplified input signal;
an analog-to-digital converter (ADC) configured to convert the amplified input signal to a digital output signal;

wherein, during a calibration phase, the control circuitry is configured to:
control the bias circuitry to apply a macro offset to the input signal, the macro offset to bring the amplified input signal within a dynamic range of the ADC; and
determine a micro offset to be applied during a measurement phase of the sensor based on the macro offset and the digital output signal during the calibration phase; and wherein during the measurement phase, the control circuitry is configured to control the bias circuitry to disable application of the macro offset and apply the micro offset to the input signal, the macro offset having a greater magnitude than the micro offset.

9. An electronic device comprising the circuitry of claim 1, wherein the electronic device comprises one of a camera, a printer, an imaging device, a mobile computing device, a laptop computer, a tablet computer, a games console, a remote control device, a home automation controller or a domestic appliance, a toy, a robot, an audio player, a video player, or a mobile telephone, and a smartphone.

10. A method of processing an input signal from a sensor, the method comprising:
receiving the input signal;
during a calibration phase, applying a macro offset to the input signal to obtain a biased input signal;
during a measurement phase, applying a micro offset to the input signal to obtain the biased input signal, the macro offset having a greater magnitude than the micro offset, the macro offset having a greater magnitude than the micro offset;
applying a gain to the biased input signal to obtain an amplified input signal;
converting the amplified input signal to a digital output signal,
wherein a magnitude of the macro offset is set to prevent the amplified input signal exceeding a dynamic range of the ADC; and
wherein a magnitude of the micro offset is dependent on the macro offset and the digital output signal during the calibration phase.

* * * * *